Nov. 12, 1946.  E. J. WADE  2,411,071
LOCATING EQUIPMENT
Filed July 13, 1943
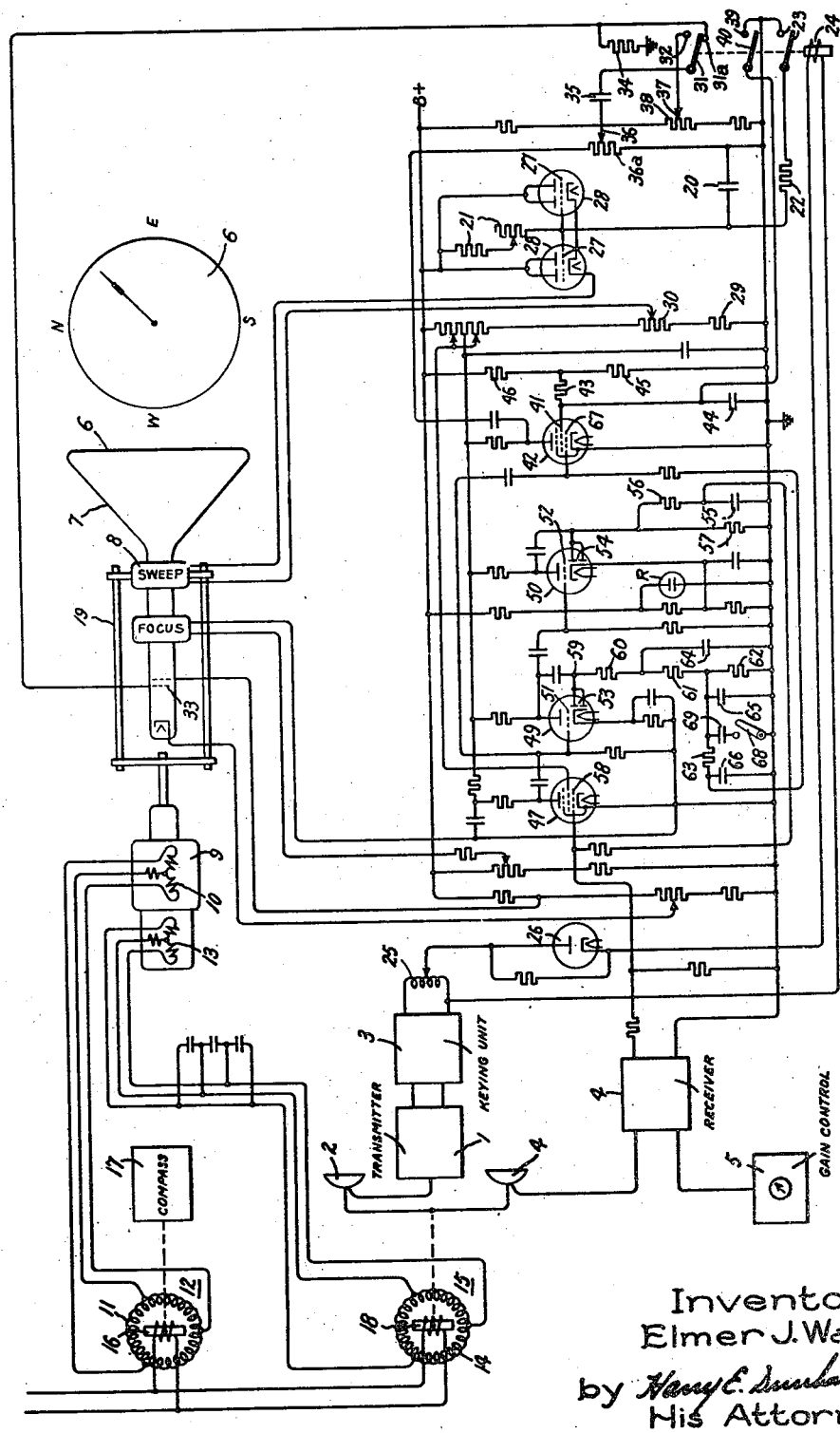
Inventor:
Elmer J. Wade,
by Harry E. Dunham
His Attorney.

Patented Nov. 12, 1946

2,411,071

UNITED STATES PATENT OFFICE 2,411,071

LOCATING EQUIPMENT

Elmer J. Wade, Pittsfield, Mass., assignor to General Electric Company, a corporation of New York Application July 13, 1943, Serial No. 494,569

6 Claims. (Cl. 177—352)

1

The present invention relates to locating equipment of the type utilizing pulses of wave energy from the object to be located to determine its position. In such equipment the accuracy of the determination is adversely affected by distortion of the amplitude and wave shape of the pulses.

The object of my invention is to provide an improved arrangement for compensating for distortion in amplitude and envelope shape of pulses of waves.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which the single figure is a diagram of locating equipment embodying my invention.

Referring to the drawing, there is shown locating equipment having a transmitter 1 associated with a directional projector 2 and a keying unit 3 so as to transmit pulses of sound waves in the desired direction and at a repetition rate which varies with the range to be investigated. When the equipment is to be used to locate under-water objects up to a maximum range of 1,000 yards, the pulses may have a duration of $\frac{1}{10}$ of a second and the interval between pulses may be 1¼ seconds, an interval equal to the time of travel of pulses out to the maximum range and back to the equipment. The reflections or echoes of the transmitted pulses from the object to be located are picked up by a receiver 4 having a manually adjustable gain control 5. The range and direction of the object are displayed on the viewing screen 6 of a cathode ray tube 7 having a sweep coil 8 turned in accordance with the true bearing of the projector 2 by a differential Selsyn 9 having a stator 10 connected to the stator 11 of a compass Selsyn 12 and having a rotor 13 connected to the stator 14 of a Selsyn 15 associated with the projector 2. The compass Selsyn 12 has a rotor 16 energized from an alternating current supply and mechanically connected to a compass 17 so that the position of the rotor with respect to the stator 11 is determined by the compass. The Selsyn 15 has a rotor 18 energized from the same alternating current supply and mechanically connected to the projector 2 so that the position of the rotor with respect to the stator 14 is determined by the direction of the projector. The voltage induced in the stators 11 and 14 vary with the positions of the rotors 16 and 18, and these voltages

2 in the differential Selsyn 9 cause the differential Selsyn rotor 13 to assume a position corresponding to the true bearing of the projector 2. By means of a mechanical connection indicated at 19, the sweep coil 8 is turned by the rotor 13 relative to the throat of the cathode ray tube 7 so that its deflecting axis lies along the true bearing of the projector with reference to the compass points marked on the viewing screen 6.

The sweep deflection is controlled by a sawtooth voltage derived from a condenser 20 charged through adjustable resistances 21. During pulse transmission the lefthand electrode of condenser 20 is grounded through a resistance 22 and contacts 23 of a relay 24 energized by the voltage across a reactor 25 connected across the keying unit 3. The keying pulses cause a voltage across the reactor 25 sufficient to operate the relay. A diode 26 connected in series with the relay prevents operation of the relay by transients following the keying pulses. At the end of each keying pulse the relay 24 opens, permitting the charging of the sweep condenser 20 at a rate determined by the adjustment of the resistances 21. The high side of the condenser 20 is connected to the grids 27 of parallel connected discharge devices 28 in series with the sweep coil 8 through a fixed resistance 29 and an adjustable resistance 30. As the condenser 20 charges, the flow of current through the sweep coil increases. The charging circuit for the sweep condenser 20 is so related to the constants of the discharge devices 28 that the current through the discharge devices (and the sweep coil 8) is zero at the instant the contacts 23 open and increases linearly to a maximum immediately prior to the closing of the contacts 23, at which time the current returns to zero. Since the contacts 23 are controlled by the keying unit, a saw-tooth current flows through the sweep coil during the intervals between the transmitted pulses, causing a deflection of the beam of the cathode ray tube (the sweep trace) along the true bearing of the transmitted pulses and through a distance proportional to the elapsed time from the last transmitted pulse. The sweep trace starts from a position defining the position of the locating equipment. Since the time of travel of the transmitted pulses is known, the instantaneous deflection of the beam of the cathode ray tube by the sweep coil is proportional to the range from which information is being obtained by the locating equipment.

The relay also has a contact 31, connected to ground through a condenser 35 and a slider 36 on a resistance 36a, and normally closed on a contact 31a connected through a resistance 34 to ground and also connected to the grid 33 of the cathode ray tube. Upon operation of the relay during pulse transmission, contact 31 is moved from contact 31a to a contact 32 connected to an adjustable tap 37 on a resistance 38 connected between ground and the high side of the power supply. Upon closing the contacts 31, 32 the condenser 35 is charged to a voltage determined by the adjustment of the tap 37. Upon opening the contacts 31, 32 and closing contacts 31, 31a the voltage of the condenser 35 is applied to the grid 33 of the cathode ray tube to momentarily increase the beam intensity and produce a spot on the screen marking the start of the sweep trace (the position of the locating equipment). The condenser 35 discharges quickly through the resistances 34 and 36a so that the length of the spot marking the beginning of the sweep trace is short compared to the length of the sweep trace.

The relay 24 also has normally open contacts 39 and 40 respectively connected to ground and to the screen grid 41 of a sharp cut-off amplifier output tube 42 (associated with the receiver 4 in a manner hereinafter described). The output of the amplifier tube 42 appears across the resistance 36a and is fed through the condenser 35 to the grid 33 of the cathode ray tube to increase the beam intensity upon receipt of an echo and produce a spot on the sweep trace marking the range and true bearing of the object to be located. The closing of the contacts 39 and 40 grounds the screen grid of the amplifier tube 42 and cuts off the tube during pulse transmission. This prevents operation by sound waves picked up by the receiver directly from the transmitter. At the end of each transmitted pulse the contacts 39 and 40 open and the screen grid 41 assumes its normal potential at a rate determined by a resistance 43 connected to the screen grid and in series with a condenser 44 to ground. The resistance 43 is connected to a voltage divider comprising resistances 45 and 46 connected between ground and the high side of the power supply.

The echoes of the transmitted pulses picked up by the receiver 4 are fed through a two-stage resistance coupled amplifier having a remote cut-off tube 47 in the input stage and the sharp cut-off tube 42 in the output stage. The output of the tube 47 is also fed through two stages of automatic volume control comprising tubes 49 and 50 respectively having triode sections 51 and 52 connected as resistance coupled amplifiers and diode sections 53 and 54. The output of the tube 50, which has been amplified by the tube 47 and by the triode sections 51 and 52 of tubes 49 and 50, is fed through the diode section 54 causing a negative charge to appear on a condenser 55. The condenser 55 is shunted by resistances 56 and 57 of a value such that the time constant is slower than the pulse width but faster than the pulse interval. The voltage on the condenser accordingly does not rise appreciably during the receipt of an echo but will follow any changes in the signal level brought about by manual adjustment of the gain control 5. The voltage of the condenser 55 is fed to the grid 58 of the tube 47 and adjusts the gain of the tube inversely with the signal level so as to maintain a constant output. Without the automatic volume control, manual adjustment of the gain control 5 might cause an increase in the amplifier output sufficient to increase the intensity of the beam of the cathode ray tube and produce a false indication.

The cathode of tube 50 is maintained at a positive voltage of about 18 volts by the voltage regulator tube "R" and a resistance divider. The purpose of this is to allow the diode section of this tube to rectify when the signal level at this point exceeds that which is normally held by the automatic volume control previously described. This will occur at the time that an echo is being received for the reason that the time constants of the automatic volume control are adjusted so that the gain will not vary appreciably during the echo. Thus any sudden increase in the signal level (such as the receipt of an echo) will cause point 59 to be driven negative by an amount sufficient to cut off the output of tube 42. This does not occur instantly however because point 59 is connected through a resistance 60 to a network comprising resistances 61, 62, and 63 and condensers 64, 65, 66. The time constant of the network is faster than the pulse width so the negative voltage appearing at the condenser 66 lags the envelope of the signal. The voltage of the condenser 66 is applied to the grid 67 of the sharp cut-off tube 42 and at a predetermined time after the incidence of the echo biases the tube to cut-off. The voltage on the condenser 66 reaches a value sufficient to cut the tube 42 off during the first part of the reception of an echo so the voltage of the condenser 66 acts to cut off the trailing end of the echo. The output of the tube 42 is applied to the grid 33 of the cathode ray tube to increase the beam intensity upon receipt of an echo and produce a spot on the screen of the cathode ray tube 6 marking the position of the object from which the echo is received. Since the voltage of the condenser 66 acts to cut off the trailing end of the echo, the resulting spot on the screen is shortened to provide a more precise representation of the location of the object.

Before contact is made with the object to be located, the condenser 66 may be grounded by a switch 68 in series with a large condenser 69. This disables the automatic volume control for the tube 42 and permits modulation of the beam of the cathode ray tube by the full echo. After contact is made with the object to be located, the switch 68 is opened so the beam is modulated only by the leading end of the echo.

The automatic volume control for tube 47 in the input stage of the amplifier tends to maintain a constant average signal level so the beam intensity of the cathode ray tube will be increased only during receipt of an echo. The automatic volume control for the tube 42 in the output stage of the amplifier clips the trailing end of the echo so that a sharper indication is presented on the screen of the cathode ray tube of the location of the object from which the echo is received. Clipping the trailing ends of the echoes compensates for distortion which tends to make the echoes of longer duration than the transmitted pulses. From one aspect, clipping the trailing ends sharpens the received pulses.

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States is:

1. An amplifier for periodic pulses comprising a remote cut-off input stage, a sharp cut-off output stage, an automatic volume control having a time constant intermediate the pulse width and the pulse interval for controlling the gain of said input stage, and an automatic volume control having a time constant faster than the pulse width for controlling the gain of said output stage to cut off the trailing ends of the pulses.

2. A pulse sharpening amplifier having a sharp cut-off stage and an automatic volume control having a time constant faster than the pulse width for controlling the gain of said stage to cut off the trailing ends of the pulses.

3. In locating equipment, a receiver for pulses from the object to be located, means for manually adjusting the gain of the receiver, an amplifier connected to the receiver output having a remote cut-off input stage, a sharp cut-off output stage, and an automatic volume control having a time constant faster than changes in signal level due to the gain control for controlling the gain of said input stage, and an automatic volume control having a time constant faster than the pulse width for controlling the gain of said output stage to cut off the trailing ends of the pulses.

4. In combination, a cathode ray tube having a viewing screen on which a cathode ray beam impinges, a control for the beam intensity, and a control for the deflection of the beam, a sweep circuit connected with the deflection control for producing a sweep trace, and a pulse amplifier connected with the beam intensity control for modulating the beam intensity in accordance with pulse signals, to mark the positions of pulses on the sweep trace, said pulse amplifier having an automatic volume control fast enough to maintain a constant signal level in the amplifier independent of changes of the sort due to adjustments of the signal level but slow enough so that pulses stand out above the signal level, and another automatic volume control faster than the pulses for clipping the trailing ends of the pulses so as to secure a sharper modulation of the sweep trace.

5. In an amplifier for periodic pulses, an automatic volume control having a time constant slower than the pulse width for maintaining a constant signal level, and an automatic volume control having a time constant faster than the pulse width for cutting off the trailing ends of the pulses.

6. In combination, means for producing a sweep trace, and means including a pulse amplifier for modulating the sweep trace to mark the position of pulses on the sweep trace, said pulse amplifier having an automatic volume control fast enough to maintain a constant signal level in the amplifier independent of changes of the sort due to adjustments of the signal level but slow enough so that pulses stand out above the signal level, and another automatic volume control faster than the pulses for clipping the trailing ends of the pulses so as to secure a sharper modulation of the sweep trace.

ELMER J. WADE.